Oct. 30, 1962  W. P. ANDERSON ET AL  3,061,315
O RING TYPE PIVOT SEAL
Filed July 18, 1960

INVENTORS
WILLIAM P. ANDERSON
JOHN W. POOLE
BY Carl Baker

ATTORNEY-

# United States Patent Office 3,061,315
Patented Oct. 30, 1962

3,061,315
"O" RING TYPE PIVOT SEAL
William Paul Anderson and John W. Poole, Wenham, Mass., assignors to General Electric Company, a corporation of New York
Filed July 18, 1960, Ser. No. 43,449
3 Claims. (Cl. 277—5)

This invention relates to fluid seal structures for lever pivot mechanism, and more particularly relates to a seal structure of this type utilizing an O ring element in an arrangement minimizing any force loading on the lever element attributable to swelling or other distortion of the O ring.

While O ring seal structures are widely used for sealing movable elements having either rotary or translatory motion and provide adequate security against leakage in such applications, the problem of sealing a member which is subject to pivotal motion frequently presents difficulties. This is particularly true in applications wherein the pivotal motion of the member to be sealed must transmit a control or other signal at such low force level that any extraneous force introduced by the seal might seriously detract from the accuracy of signal transmission. Typical of applications in which such a seal is necessary are turbojet engine fuel controls wherein a control signal generated by an air pressure sensitive bellows assembly is to be transmitted by means of a pivoted lever member connecting to a fuel flow valve or like control element which is to be responsive to the bellows output signal. Normally the bellows assembly is mounted in an air chamber and the flow control element in a fuel chamber, and the seal then serves to prevent leakage between these chambers along the lever member.

The difficulty in design of O ring type seals for applications of this sort is compounded by the tendency of the elastic materials of which O ring elements normally are fabricated to swell or distort upon immersion in turbine engine fuels. In conventional seal structures such swelling and distortion of the O ring may impose extraneous force loading on the lever member thus impairing the accuracy of the signal which it is to transmit.

The present invention is directed to seal structures of the general type just described and has as its principal objective the provision of new and improved such structures which effectively minimize any force loading by the seal tending to movement of the member sealed. It is also an object of the invention to provide such lever pivot seal structures characterized by simplicity of construction and corresponding economy of manufacture.

In carrying out the invention in one preferred embodiment wherein seal structure is to be provided for a lever member which extends between two chambers and is pivotally mounted adjacent a wall member separating these chambers, the seal includes an O ring element of elastic material compressed between opposed surfaces one of which is defined by the chamber wall means and the other by a surface of revolution formed on the lever member adjacent to but spaced from its pivot axis. This surface of revolution is of configuration such that all perpendiculars through its line of contact with the O ring element intersect the pivot axis. With this arrangement, any force loading on the lever member due to swelling or other distortion of the O ring is largely perpendicular to the lever member surface of revolution and accordingly is directed through and neutralized at the lever pivot; hence there is no effective force component tending to rotate the lever member about its pivot.

The invention will itself be further understood and its various objects, features and advantages more fully appreciated by reference to the appended claims and the following detailed description when read in conjunction with the accompanying drawing, wherein:

Figure 1:
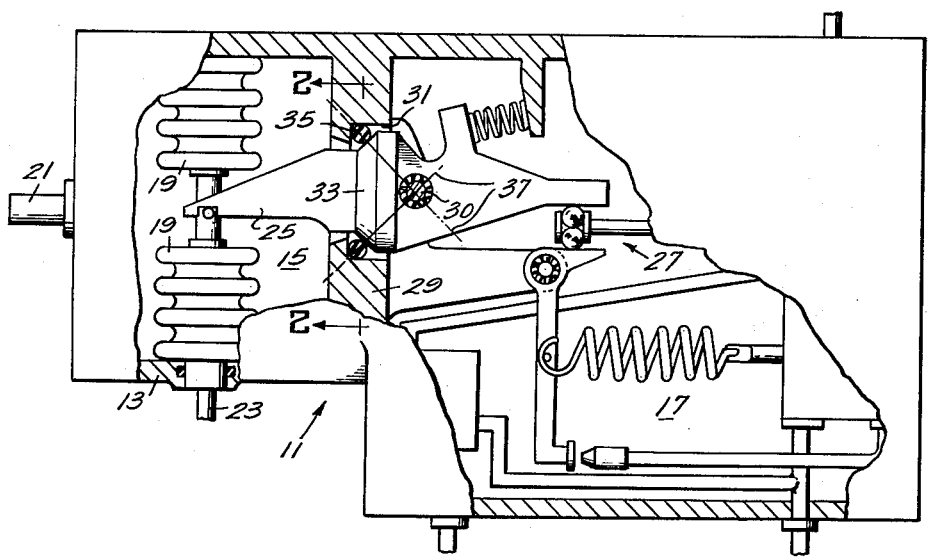
FIGURE 1 is a part sectional view of turbine engine fuel control mechanism embodying a pivot seal arrangement in accordance with the invention.
Figure 2:
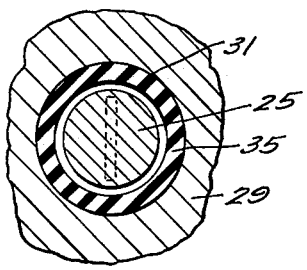
FIGURE 2 is a sectional view taken along the line 2—2 in FIGURE 1.

With continued reference to the drawings, wherein like reference numerals have been used throughout to designate like elements, FIGURE 1 illustrates the invention by way of example as embodied in an engine fuel control system. The details of this system as such form no part of the present invention and accordingly only those parts of the system necessary to understanding of the present invention are shown in FIGURE 1 and described hereinafter.

In FIGURE 1, the engine fuel control designated generally by reference numeral 11 comprises housing wall means 13 defining two chambers 15 and 17 which during operation of the control are filled with air and engine fuel, respectively. In the air chamber 15, a bellows assembly 19 is arranged to be responsive to air pressures supplied through lines 21 and 23, to load one end of a lever element 25 with a force varying in accordance with these air pressures.

Lever 25 at its other end coacts with fuel flow control mechanism designated generally by reference numeral 27 to modulate the rate of fuel flow to the engine in accordance with the air pressures sensed by bellows 19 and also in accordance with certain other engine operating parameters introduced through the control mechanism 27 in a manner not important to the present invention. It may be noted, however, that in the normal operation of this control mechanism the chamber 17 remains filled with engine fuel at a pressure higher than the air pressure in chamber 15.

The lever 25 is mounted for pivotal movement on a shaft 30 the ends of which are fixed in the housing 13 adjacent the housing wall member 29 which separates chambers 15 and 17. To seal between these two chambers yet permit the required pivotal motion of lever 25 about its pivot axis through shaft 30, an O ring type seal element 35 is provided. Seal ring 35 is located in a circular recess 31 formed in wall member 29, which recess preferably is of diameter such that the seal ring is circumferentially compressed on being assembled into the recess. The seal ring also is compressed between the bottom surface of recess 31, which surface is disposed substantially perpendicular to the longitudinal axis of lever member 25 and preferably but not necessarily is planar, and an opposed surface 33 formed on lever member 25 as shown.

Figure 3:
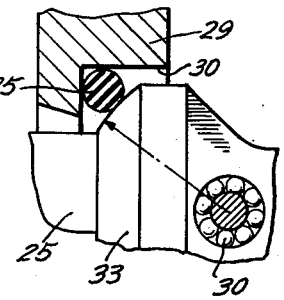
FIGURE 3 is a part sectional view similar to FIGURE 1 showing an alternative embodiment of the invention.

Surface 33 is a surface of revolution having its axis substantially coincident with the longitudinal axis of the lever member 25, and is of configuration such that lines normal to it through its line of contact with the O ring element 35 intersect the axis of the pivot shaft 30, as indicated by the dot-dash lines 37. This surface of revolution may be in the form of the frustrum of a right circular cone as illustrated in FIGURE 1, or, if preferred, may be in the form of a zone of a sphere the center of which lies on the pivot axis as illustrated in FIGURE 3.

The O ring element 35 preferably is of an elastic material and is selected from the available such materials with at least one criteria for selection being resistance to reaction with the fuel or other fluid to which it will be exposed, where such reaction may cause swelling or other distortion of the O ring material. Of the presently available materials otherwise acceptable, however, all display tendencies to swell or otherwise deform when subjected to fuel immersion particularly over long periods of time and at elevated temperatures as frequently encountered in turbine engine control applications. With the O ring seal construction just described, the effects of such seal material deformation are effectively minimized by virtue of the fact that the forces exerted by the O ring element against the lever member 25 act substantially perpendicularly to surface 33 and this surface is normal to lines through its points of contact with the O ring and through the pivot axis. Such forces accordingly are directed through and absorbed by the pivot shaft, and there is no net force tending to rotate the lever 25 and detract from the accuracy of the force or position signal which it transmits.

It will be appreciated that regardless of the direction of the pressure differential across the seal ring 35, this pressure differential will urge the O ring more tightly into sealing engagement with the opposed surfaces of recess 31 and the surface of revolution 33. Since only limited movement of the lever member 25 is required the seal readily accommodates such movement, partially through compression of the seal ring and partially through relative movement between it and the surfaces against which it seals. Such relative movement is facilitated by making the surface of revolution in the form of a spherical zone as previously explained, since this enables a greater range of movement of the lever member without appreciable asymmetric loading of the seal ring.

While only one embodiment of the invention has been described and illustrated by way of example in the foregoing, many modifications will occur to those skilled in the art and it therefore should be understood that the appended claims are intended to cover all such modifications as fall within the true spirit and scope of the invention.

What is claimed as new and desired to be secured by Letters Patent of the United States is:

1. In combination, wall means defining a fluid chamber, a lever member projecting through said wall means, pivot means mounting said lever member for pivotal movement about a pivot axis disposed adjacent said wall means, and means for sealing against fluid leakage along said lever member comprising a circular section elastic ring element sealingly contacting opposed surfaces respectively defined by said wall means and by said lever member with both said surfaces spaced from said pivot axis, the latter of such surfaces being constituted by the frustrum of a right circular cone having its axis substantially coincident with the longitudinal axis of said lever member and of altitude such that perpendiculars through its line of contact with said ring element intersect said pivot axis and so disposed that said line of contact is intermediate the ends of the frustrum.

2. In combination, wall means defining a fluid chamber, a lever member projecting through said wall means, pivot means mounting said lever member for pivotal movement about a pivot axis disposed adjacent said wall means, and means for sealing against fluid leakage along said lever member comprising a circular section elastic ring element sealingly contacting opposed surfaces respectively defined by said wall means and said lever member with both said surfaces spaced from said pivot axis, the latter of such surfaces being constituted by a zone of a sphere having its center on said pivot axis and having a line of contact with said ring element intermediate the ends of the zone.

3. In combination, wall means defining a fluid chamber, a lever member projecting through said wall means, pivot means mounting said lever member for pivotal movement about a pivot axis disposed adjacent said wall means, and means for sealing against fluid leakage along said lever member comprising a circular section elastic ring element sealingly contacting opposed surfaces respectively defined by said wall means and by said lever member with both said surfaces spaced from said pivot axis, the latter of said surfaces being a surface of revolution so disposed as to have a line of contact with said ring element intermediate the ends of the surface of revolution and so disposed that perpendiculars through this line of contact intersect the pivot axis and if convergent with other perpendiculars through said surface of revolution are convergent only toward said pivot axis.

References Cited in the file of this patent

UNITED STATES PATENTS

| | | |
|---|---|---|
| 1,920,971 | De Giers | Aug. 8, 1933 |
| 1,936,328 | Giesler | Nov. 21, 1933 |
| 2,083,584 | Wineman | June 15, 1937 |
| 2,271,151 | Fina et al. | Jan. 27, 1942 |
| 2,744,984 | Hultx | May 8, 1956 |
| 2,757,688 | Klingler | Aug. 7, 1956 |
| 2,795,667 | Schwerke | June 11, 1957 |
| 2,929,252 | Evers et al. | Mar. 22, 1960 |
| 2,977,140 | Buchter | Mar. 28, 1961 |
| 3,000,227 | Buchter | Sept. 19, 1961 |

FOREIGN PATENTS

| | | |
|---|---|---|
| 878,164 | France | Jan. 13, 1943 |
| 1,006,417 | France | Apr. 23, 1952 |